US008094003B2

(12) United States Patent
Masui et al.

(10) Patent No.: US 8,094,003 B2
(45) Date of Patent: Jan. 10, 2012

(54) DISPLAY CONTROL UNIT, ON-VEHICLE DISPLAY SYSTEM, DISPLAY CONTROLLER, AND ON-VEHICLE DISPLAY

(75) Inventors: Teruhisa Masui, Osaka (JP); Fumiaki Fujimoto, Osaka (JP); Osamu Nishida, Osaka (JP); Masayuki Fujisawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 475 days.

(21) Appl. No.: 12/513,706

(22) PCT Filed: Aug. 21, 2007

(86) PCT No.: PCT/JP2007/066193
§ 371 (c)(1),
(2), (4) Date: May 6, 2009

(87) PCT Pub. No.: WO2008/062592
PCT Pub. Date: May 29, 2008

(65) Prior Publication Data
US 2010/0271194 A1 Oct. 28, 2010

(51) Int. Cl.
*B60Q 1/00* (2006.01)
*G08B 25/00* (2006.01)
*G08B 5/00* (2006.01)
*G06T 1/00* (2006.01)
(52) U.S. Cl. ..... 340/461; 340/462; 340/525; 340/815.4; 340/507; 340/691.6; 700/17; 701/30; 701/39; 345/204; 345/522; 345/619

(58) Field of Classification Search .......... 340/461, 340/462, 525, 815.4
See application file for complete search history.

(56) References Cited

U.S. PATENT DOCUMENTS 5,850,540 A * 12/1998 Furuhashi et al. ............ 345/501
2008/0309474 A1 12/2008 Okamoto et al.

FOREIGN PATENT DOCUMENTS

| JP | 2003-043449 A | 2/2003 |
| JP | 2005-115107 A | 4/2005 |
| JP | 2005-221664 A | 8/2005 |
| WO | 2006/022191 A1 | 3/2006 |

OTHER PUBLICATIONS

Official Communication issued in International Patent Application No. PCT/JP2007/066193 mailed on Sep. 25, 2007.

* cited by examiner

Primary Examiner — Donnie Crosland
(74) Attorney, Agent, or Firm — Keating & Bennett, LLP

(57) ABSTRACT

An on-vehicle display control unit includes a CPU to which vehicle data of various kinds are inputted and a graphic LSI arranged to generate display data to be outputted to a display. The graphic LSI is arranged to generate predetermined display data from image data generated by a meter ECU. However, if there is a problem in a state of the meter ECU or an input status of 3D moving picture data, the graphic LSI receives a fail safe control from the CPU (4), thereby to generate fail safe display data corresponding to the predetermined display data. This realizes an on-vehicle display system capable of stably displaying important vehicle information.

22 Claims, 9 Drawing Sheets

MONITORING OF THE STATE OF ECU 28
BY REGULAR COMMUNICATIONS

DISPLAY CONTROL UNIT, ON-VEHICLE DISPLAY SYSTEM, DISPLAY CONTROLLER, AND ON-VEHICLE DISPLAY

BACKGROUND OF THE INVENTION

1. Field of the Invention

The present invention relates to an on-vehicle display system installed in a controllable mobile object, such as a vehicle or the like, and also relates to a display control unit applied thereto (e.g., an ECU).

2. Description of the Related Art

In recent years, an on-vehicle display system has been suggested in which meters and gauges, such as a speedometer, an engine speed indicator, and the like, a navigation picture, and a CCD image are displayed on a display panel included in an instrument panel of an automobile or the like.

In such an on-vehicle display system, it is especially demanded that important vehicle information such as meters and gauges, such as a speedometer, an engine speed indicator, and the like be stably displayed. That is, even if a portion of what is related to electronics in a vehicle malfunctions, such important vehicle information as mentioned above needs to be still displayed so as to secure the safety of driving.

Japanese Patent Application Publication, Tokukai, No. 2005-221664 discloses a vehicle multi-monitor system including a plurality of displays, the vehicle multi-monitor system being capable of still displaying important information even if any of the displays malfunctions. This is shown in FIG. 10.

The vehicle multi-monitor system disclosed in FIG. 10 operates as below. That is, in a case where something abnormal occurs in a display 103 when the display 103 and a display 102 are in charge of displaying a meter and displaying a car navigation system, respectively, an on-vehicle server 101 detects the abnormality by self-examining data from the display 103 or the fact that the on-vehicle server 101 does not receive the self-examining data from the display 103 even after a predetermined time has elapsed. When the abnormality is detected, the on-vehicle server 101 changes the executors of applications (a meter AP 115 and/or a car navigation system AP 116). That is, in this case, the abnormality occurs in the display 103 that displays the meter. The meter displayed on the display 103 is comparatively more important for a driver than the car navigation system displayed on the display 102. Therefore, the meter AP 115 is distributed to the display 102 that operates normally. Then, the display 102 displays the meter AP 115.

In this way, when the abnormality occurs in the display for displaying specific information, the display which displayed information whose priority is lower than the specific information displays the specific information, thereby to avoid the situation where the information important for the driver is not displayed.

However, with the configuration described in Japanese Patent Application Publication, Tokukai, No. 2005-221664, meters (pieces of important information) which are supposed to be displayed in a liquid crystal monitor 131 are displayed in a liquid crystal monitor 121 for the car navigation system. That is, a location where the meters important for the driver are displayed is changed and the safety of driving may thus be affected. Furthermore, the configuration of FIG. 10 consequently makes it impossible to display the car navigation system, thereby to force the driver to suffer inconvenience as well.

SUMMARY OF THE INVENTION

In consideration of the foregoing problems, preferred embodiments of the present invention provide an on-vehicle display system capable of stably displaying important information and a display control unit applied thereto.

An on-vehicle display control unit according to a preferred embodiment of the present invention includes: a processor to which vehicle data of various kinds are inputted; and a display data generating section arranged to generate display data to be outputted to a display, the display data generating section generating predetermined display data from image data generated outside the display control unit, but the display data generating section receiving a fail safe control from the processor in case of a problem with what generates the image data or with input of the image data, so as to generate fail safe display data corresponding to the predetermined display data.

The display data generating section is arranged to generate the predetermined data from the image data generated outside the display control unit at normal times. When it is impossible to use the image data due to some problem and to generate the predetermined data, the display data generating section generates the fail safe display data alternative to the predetermined display data by the fail safe control from the processor.

According to the configuration, for example, in a case where important vehicle information is displayed by the predetermined display data, it is possible to continue stably displaying the important vehicle information by the fail safe display data even when a problem with what generates the image data or input of the image data occurs.

The display control unit according to a preferred embodiment of the present invention is desirably arranged such that the display data generating section, even at normal times when the problem does not occur, generates alternative data corresponding to the image data in accordance with instructions from the processor. In this case, for example, the display data generating section receives the fail safe control, so as to generate the fail safe display data from the alternative data. This makes it possible to immediately use the alternative data when the problem occurs, thereby to enhance the safety of driving.

The display control unit according to a preferred embodiment of the present invention is preferably arranged such that the processor monitors at least one of (i) what generates the image data and (ii) the input of the image data, and the processor carries out the fail safe control in response to occurrence of the problem.

The display control unit according to a preferred embodiment of the present invention is desirably arranged such that the predetermined display data is data for displaying a default image of meters and gauges. This makes it possible to continue stably displaying the image of the meters and gauges which is the important vehicle information.

In this case, it is desirable that the fail safe display data be data for displaying a fail safe image corresponding to the default image at the same display position in the same display size as the default image. As a result, even if the default image is changed to the fail safe image, the driver hardly feels anything strange. This thus makes it possible to more enhance the safety of driving.

It is also desirable that the fail safe display data be data for displaying the fail safe image corresponding to the default image in a simpler style than the default image. This is because the fail safe image may be an image which can guarantee the safety of driving, but need not be such a high-quality image as the default image.

The display control unit according to a preferred embodiment of the present invention is desirably arranged such that the image data and the alternative data are both moving picture data, the alternative data being smaller in size than the image data. For example, the image data and the alternative data may be 3D moving picture data and 2D moving picture data, respectively. Given that the alternative data is constantly generated, it is possible to reduce burdens on the processor and the display data generating section by making the alternative data smaller.

The display control unit according to a preferred embodiment of the present invention may also be arranged such that the fail safe control causes the processor to output second display layout data instead of first display layout data that is outputted by the processor when the problem does not occur; the display data generating section generates, based on the first display layout data, the predetermined display data from still picture data stored and the image data, so that the predetermined display data is generated as data for displaying the default image of the meters and gauges, but when receiving the fail safe control, the display data generating section generates, based on the second display layout data, the fail safe display data from the still picture data stored and the alternative data, so that the fail safe display data is generated as data for displaying the fail safe image of the meters and gauges.

The display control unit according to a preferred embodiment of the present invention may be arranged such that the processor is connected to an in-vehicle network, from which the vehicle data is supplied.

The display control unit according to a preferred embodiment of the present invention may be arranged such that the image data generated by an image data generating unit connected to the in-vehicle network is supplied to the display data generating section.

The display control unit according to a preferred embodiment of the present invention may be arranged such that the processor monitors a state of the image data generating unit via the in-vehicle network.

The display control unit according to a preferred embodiment of the present invention may be arranged such that the processor monitors an input status of the image data inputted from the image data generating unit to the display data generating section.

The display control unit according to a preferred embodiment of the present invention is desirably arranged such that the display data generating section is capable of saving the first display layout data outputted from the processor, the display data generating section, based on the first layout data, generating the data for displaying the image of the meters and gauges even when there is a problem in the processor. According to this, even if the processor malfunctions, it is possible to continue stably displaying the image of the important meters and gauges, thereby to enhance the safety of driving.

The display control unit according to a preferred embodiment of the present invention may also be arranged such that the in-vehicle network is any one of CAN (Controller Area Network), LIN (Local Interconnect Network), MOST (Media Oriented Systems Trans-Port), and FlexRay (registered trademark).

The display control unit according to a preferred embodiment of the present invention may also be arranged such that the processor is configured by a CPU; and the display data generating section is configured by a graphic LSI.

An on-vehicle display system according to a preferred embodiment of the present invention preferably includes: a display control unit as set forth above; and a display.

As mentioned above, according to the display control unit according to a preferred embodiment of the present invention, even when it is impossible to use the image data due to some problem and to generate the predetermined data, it is possible to generate the fail safe display data alternative to the predetermined display data by the fail safe control from the processor. Therefore, in a case where the important vehicle information is displayed by the predetermined display data, it is possible to continue stably displaying the important vehicle information by the fail safe display data even when a problem with what generates the image data or input of the image data occurs.

An on-vehicle display controller according to a preferred embodiment of the present invention includes: a processor to which vehicle data is inputted; and a display data generating section arranged to generate data to display an image in a display, at normal times, the display data generating section generating data to display a default image from image data supplied from an outside thereof, wherein the display data generating section includes an auxiliary data generating section arranged to generate auxiliary data corresponding to the image data in response to instructions from the processor, the display data generating section, in case of a problem in generation of the image data or input of the image data, generates, from the auxiliary data, data for displaying a fail safe image alternative to the default image.

The display controller according to a preferred embodiment of the present invention may also be arranged such that the auxiliary data generating section (constantly) generates the auxiliary data also at normal times.

The display controller according to a preferred embodiment of the present invention may also be arranged such that the processor monitors at least one of the generation of the image data and the input of the image data, and in case where a problem occurs in what is monitored, the processor instructs the display data generating section to use the auxiliary data instead of the image data.

An on-vehicle display according to a preferred embodiment of the present invention includes: a display; and a display controller arranged to control the display, at normal times, the on-vehicle display displaying a default image from image data supplied from an outside of the display controller, the display controller including an auxiliary data generating section arranged to generate auxiliary data corresponding to the image data, the display controller, in case of a problem in generation of the image data or in input of the image data, displaying a fail safe image alternative to the default image from the auxiliary data.

The on-vehicle display according to a preferred embodiment of the present invention may also be arranged such that the auxiliary data generating section generates the auxiliary data also at normal times.

According to the display controller according to a preferred embodiment of the present invention, even when it is impossible to use the image data for some problem and to generate the data for displaying the default image, it is possible to generate the data for displaying the fail safe image from the auxiliary data. Therefore, in a case where the important vehicle information is displayed by the default image, it is possible to continue stably displaying the important vehicle information by the fail safe image even when a problem with what generates the image data or input of the image data occurs.

Other preferred embodiments attained by a proper combination of the foregoing configurations or technical features are also encompassed in the present invention.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
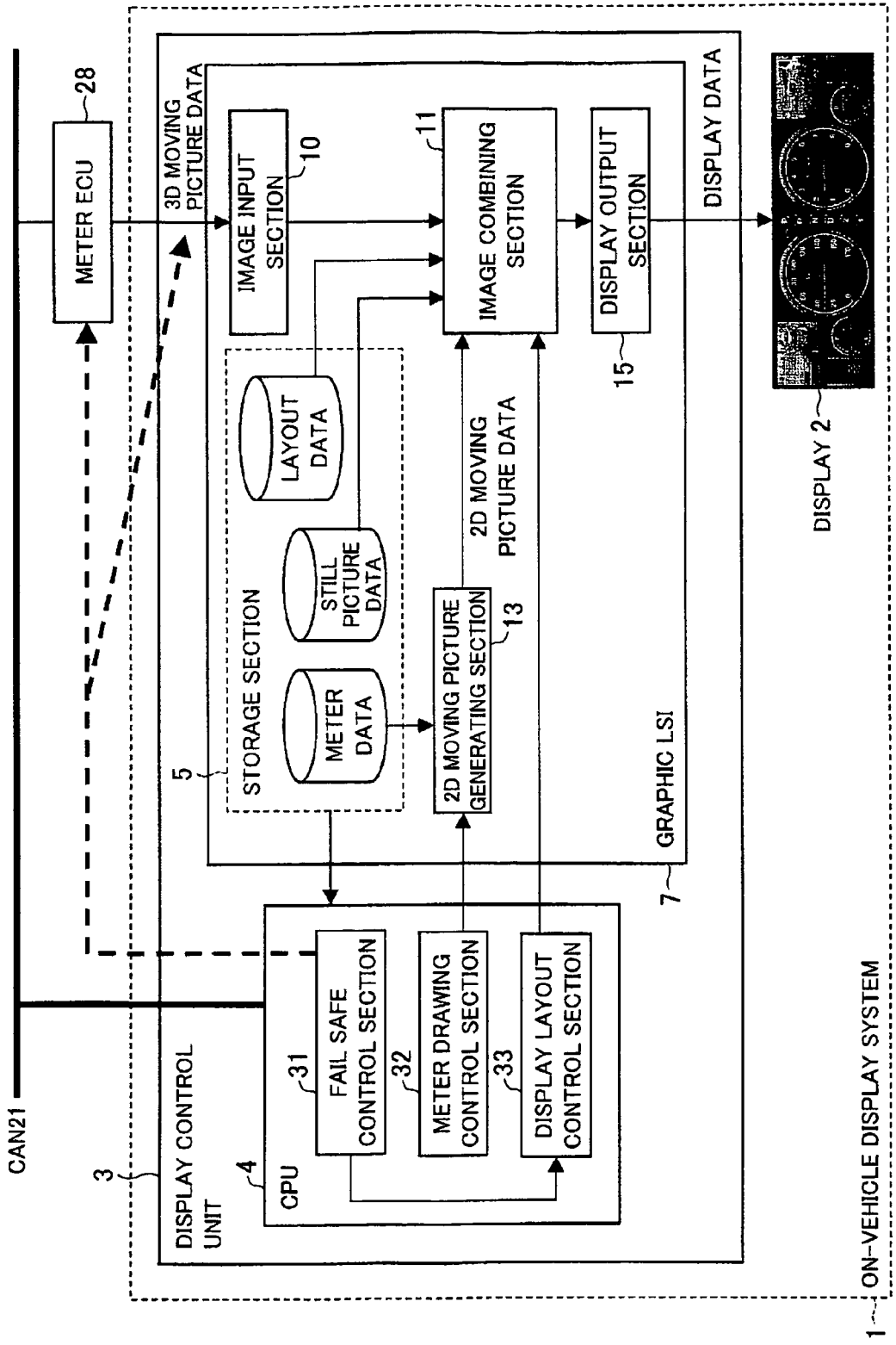
FIG. 1 is a block diagram showing a configuration of an on-vehicle display system.

Preferred embodiments of the present invention are described below with reference to FIGS. 1 to 9. FIG. 1 is a block diagram showing a configuration of an on-vehicle display system according to the present preferred embodiment. As shown in the drawing, an on-vehicle display system 1 (on-vehicle display) preferably includes a display 2, such as a liquid crystal display (LCD) or the like and a display control unit 3 (display controller). The display control unit 3 includes a CPU 4 and a graphic LSI 7.

The CPU 4 includes a fail safe control section 31, a meter drawing control section 32, and a display layout control section 33. The meter graphic LSI 7 includes a storage section 5, an image input section 10, an image combining section 11, a 2D moving picture generating section 13, and a display output section 15. The storage section 5 stores still picture data, meter data, and the like.

The display control unit 3 is connected to a CAN 21 which is an in-vehicle LAN. To the CAN 21, connected is a meter ECU 28 (image data generating unit) which is a moving picture generator outside the display control unit 3. Vehicle data of various kinds, such as a body kind, an engine kind, and the like are transmitted to the CAN 21. The meter ECU 28 uses the vehicle data obtained from the CAN 21, thereby to generate 3D moving picture data of a meter pointer of a speedometer, a tachometer, a fuel gauge, an oil temperature gauge, and the like.

The CPU 4 monitors a state of the meter ECU 28 and an input status of the 3D moving picture data and at the same time controls the graphic LSI 7 on the basis of a result of the monitoring and the vehicle data obtained from the CAN 21. On the other hand, the graphic LSI 7 receives various kinds of control from the CPU 4, thereby to generate display data to be outputted to the display 2.

An operation of the display control unit 3 is more specifically described as below.

The fail safe control section 31 of the CPU 4 monitors the state of the meter ECU 28 and the input status of the 3D moving picture data and gives the layout control section 33 instructions to change a display layout, the instruction being based on the result of the monitoring.

Figure 5:
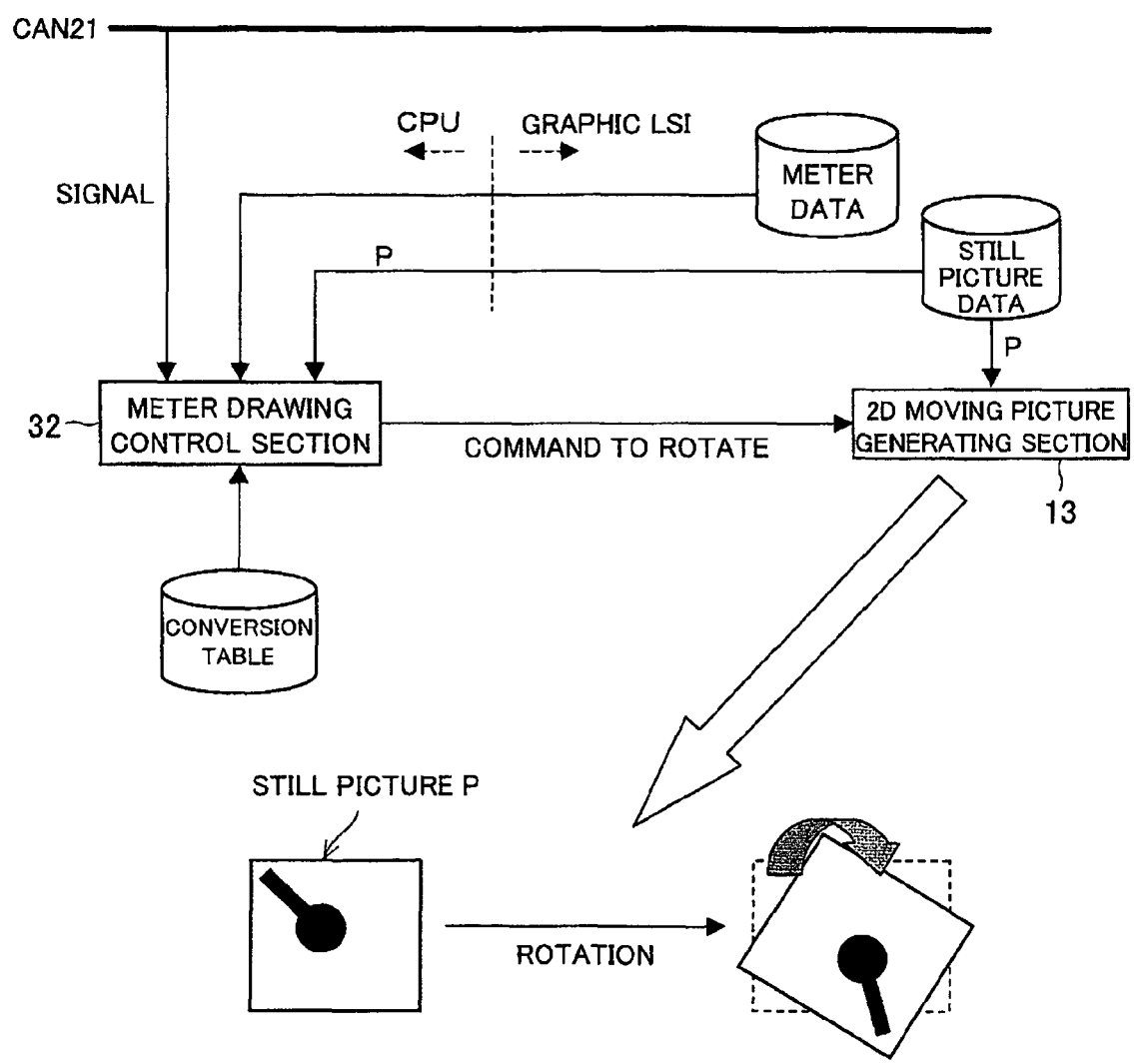
FIG. 5 is a block diagram showing an operation of the on-vehicle display system according to a preferred embodiment of the present invention at the time of a fail safe.

In the graphic LSI 7, the image input section 10 receives the meter pointer 3D moving picture data generated by the meter ECU 28, and the 2D moving picture generating section 13 (auxiliary data generating section) generates 2D moving picture data (alternative data, auxiliary data) of the meter pointer in response to a command from the meter drawing control section 32 of the CPU 4. The 2D moving picture data is constantly generated during the operation of the display control unit 3 regardless of the result of the monitoring (whether or not a problem occurs in the state of the meter CPU 28 or in the input status of the 3D moving picture data). Here, as illustrated in FIG. 5, the meter drawing control section 32 of the CPU receives the vehicle data (a change in a corresponding signal), and accordingly generates a command to rotate a still picture P of the meter pointer from a rotation conversion table and meter data. The 2D moving picture generating section 13 of the graphic LSI receives the command, and accordingly generates the 2D moving picture data by rotating the still picture P.

In this way, in the graphic LSI 7, 2D meter moving picture (meter pointer) alternative to 3D moving picture from the meter ECU 28 is always prepared. The auxiliary 2D meter moving picture is always on standby to be displayed by "2D meter drawing control".

The image combining section 11 receives instructions from the display layout control section 33 of the CPU 4, thereby to generate the data (display data) for displaying a meter image in the display 2 from meter pointer moving picture data inputted and still picture data stored in the storage section 5.

Figure 2:
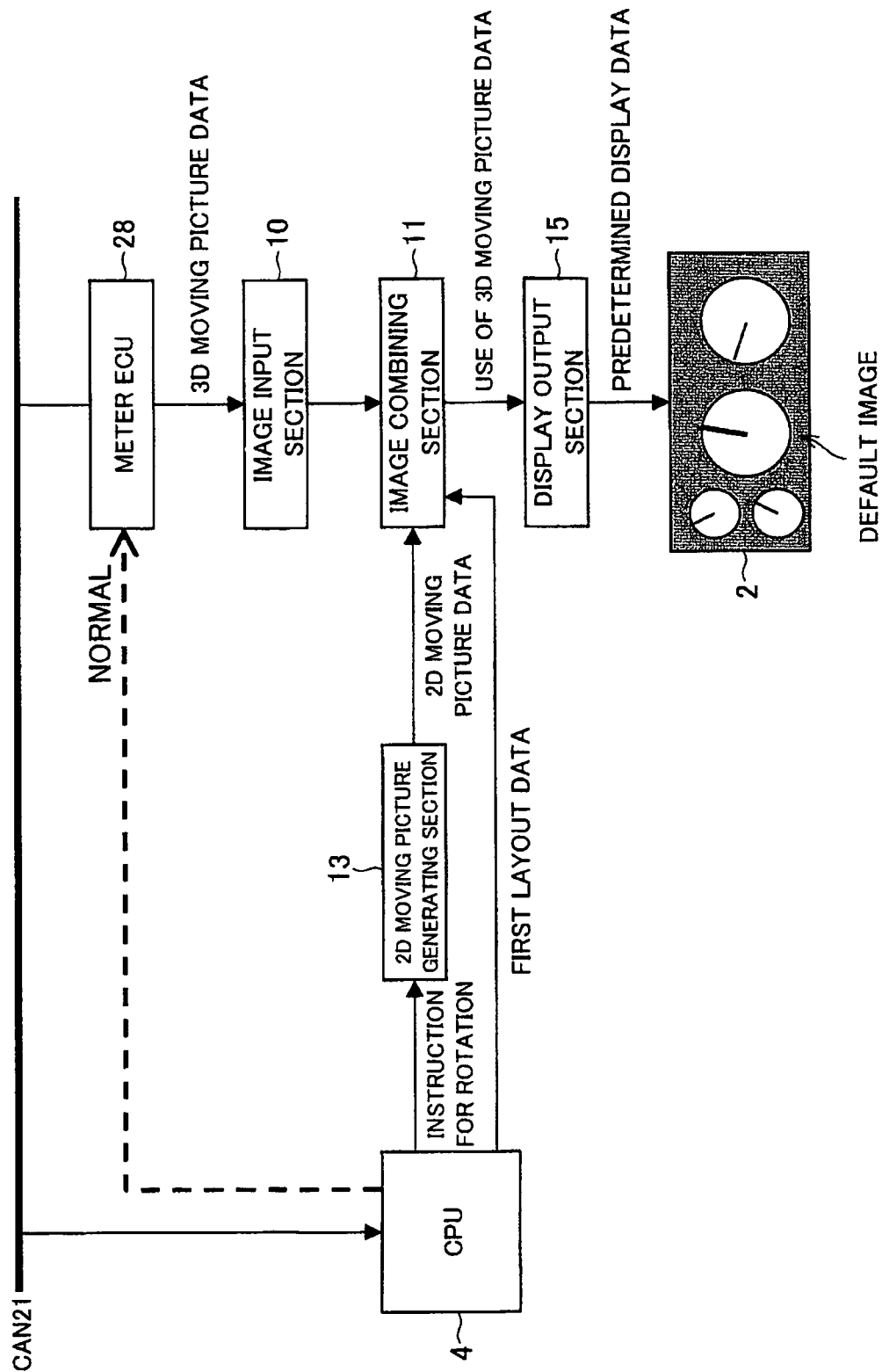
FIG. 2 is a schematic view showing an image-combining process in a graphic LSI.
Figure 3:
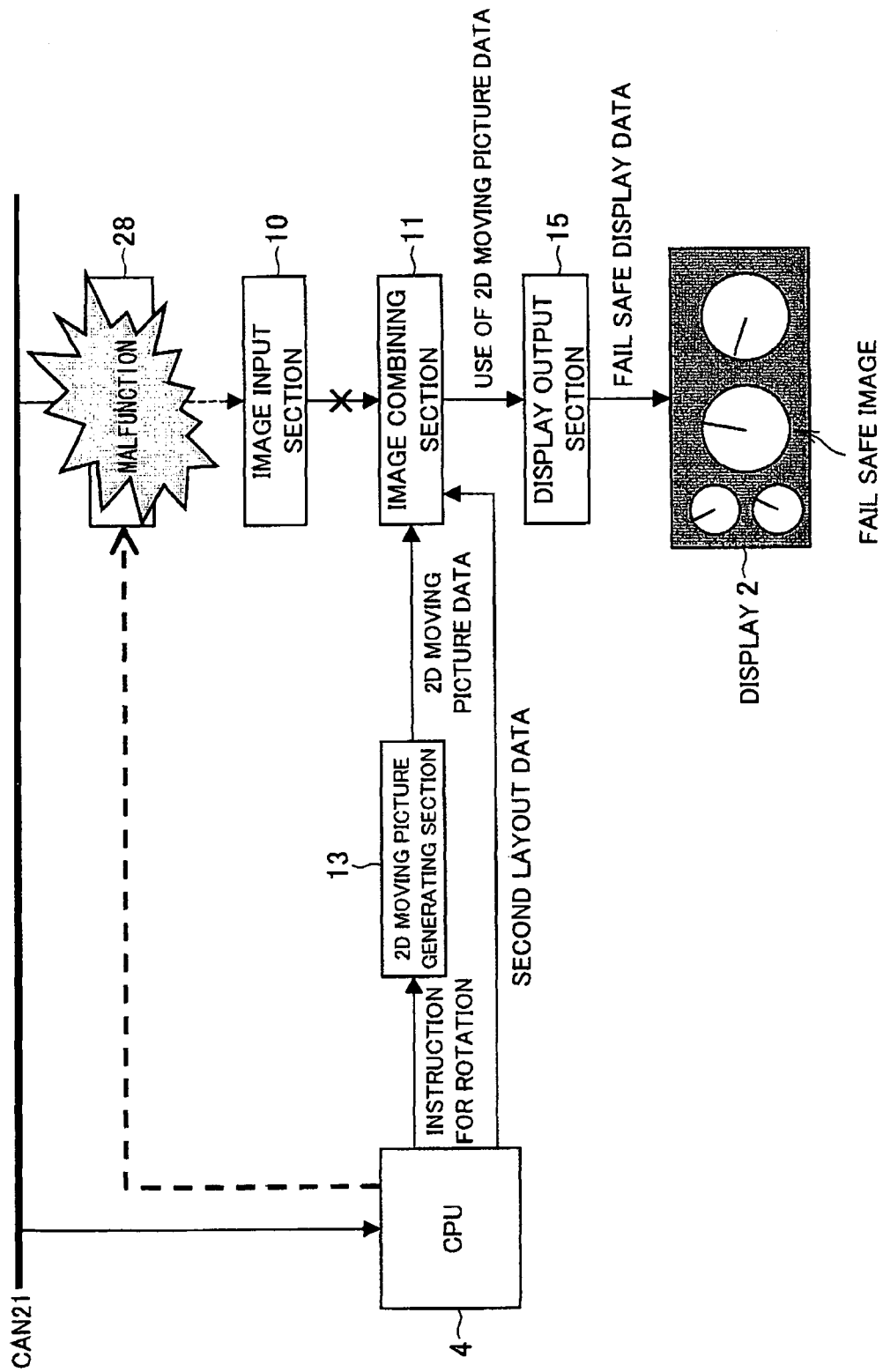
FIG. 3 is a schematic view showing a process of generating 2D moving picture data in a graphic LSI.

Here, the display layout control section 33 responds to the instructions from the fail safe control section 31 to change the display layout, thereby to change display layout data to be issued. That is, as shown in FIGS. 2 and 3, the display layout control section 33 outputs first layout data to the graphic LSI 7 (image combining section 11) when there is no problem with the state of the meter ECU 28 and the input status of the 3D moving picture data. However, the display layout control section 33 outputs second layout data instead of the first layout data to the graphic LSI 7 (image combining section 11) when there is a problem with the state of the meter ECU 28 or the input status of the 3D moving picture data (a fail safe control by the CPU 4). Furthermore, each of the layout data contains a rectangle for a moving picture and this thus makes it possible to display a designated moving picture in a designated rectangular area.

In this way, when there is no problem in the state of the meter ECU 28 and the input status of the 3D moving picture data (refer to FIGS. 2 and 4), the image combining section 11 of the graphic LSI 7 generates the display data (predetermined display data) from the still picture data of the storage section 5 and the meter pointer 3D moving picture data generated by the meter ECU 28. However, when there is a problem in the state of the meter ECU 28 or the input status of the 3D moving picture data (refer to FIGS. 3 and 4), the image combining section 11 of the graphic LSI 7 generates the display data (fail safe display data) from the still picture data of the storage section 5 and the meter pointer 2D moving picture data generated by the 2D moving picture generating section 13 of the graphic LSI 7.

The predetermined display data generated by the image combining section 11 (display data generated from the still picture data of the storage section 5 and the meter pointer 3D moving picture data generated by the meter ECU 28) is supplied to the display 2 via the display output section 15. By this, the display 2 displays a default image of the meter thereon (Refer to FIG. 2).

Moreover, the fail safe display data generated by the image combining section 11 (display data generated from the still picture data of the storage section 5 and the meter pointer 2D moving picture data generated by the 2D moving picture generating section 13) is supplied via the display output section 15 to the display 2, where a fail safe image is displayed from the fail safe display data (Refer to FIG. 3).

Further, it is desirable that the fail safe display data be data for displaying the fail safe image at the same display position in the same size as the default image. (Refer to FIGS. 2 to 4).

Figure 6:
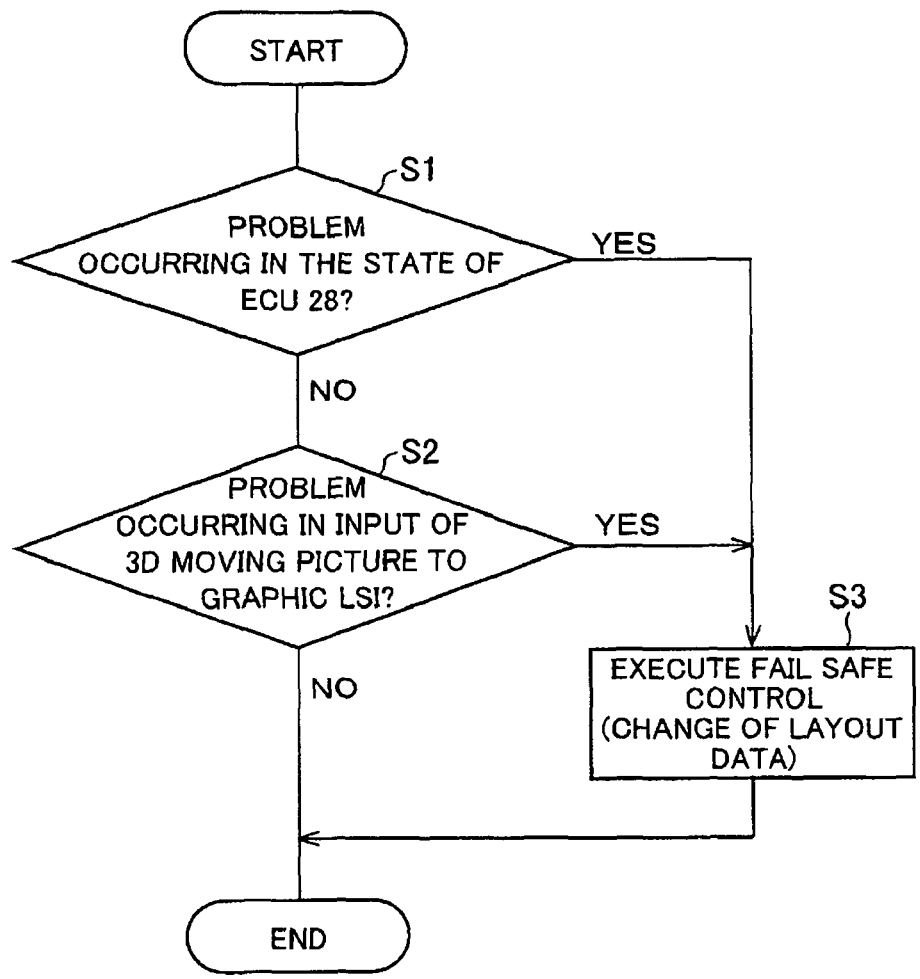
FIG. 6 is a flowchart showing a process related to a fail safe control in the on-vehicle display system according to a preferred embodiment of the present invention.

Here, an operation flow of the CPU 4 according to the fail safe control is shown in FIG. 6. First, the fail safe control section 31 judges the state of the meter ECU 28 at S1. When there is a problem, the operation proceeds to S3, where the display layout control section 33 changes the layout data in accordance with the instructions from the fail safe control section 31 (changes the layout data from the first layout data to the second layout data). When there is no problem in the state of the meter ECU 28 at S1, the operation proceeds to S2, where the fail safe control section 31 judges the input status of the 3D moving picture data (inputted to the graphic LSI 7). Here, when there is a problem in the input status, the operation proceeds to S3, where the display layout control section 33 changes the layout data in accordance with the instructions from the fail safe control section 31 (changes the layout data from the first layout data to the second layout data). Furthermore, when there is no problem at S2, the operation is finished.

In this way, the display control unit 3 generates the display data for the default image from the 3D moving picture data generated by the meter ECU 28 outside the display control unit at normal times. On the other hand, when there is a problem in the state of the meter ECU 28 or the input status of the 3D moving picture data and thus the data for displaying the meter default data cannot be generated, the display control unit 3 receives the fail safe control from the CPU 4, thereby to generate the display data for displaying the meter fail safe image. This makes it possible to stably display the meter image which is important vehicle information.

Figure 4:
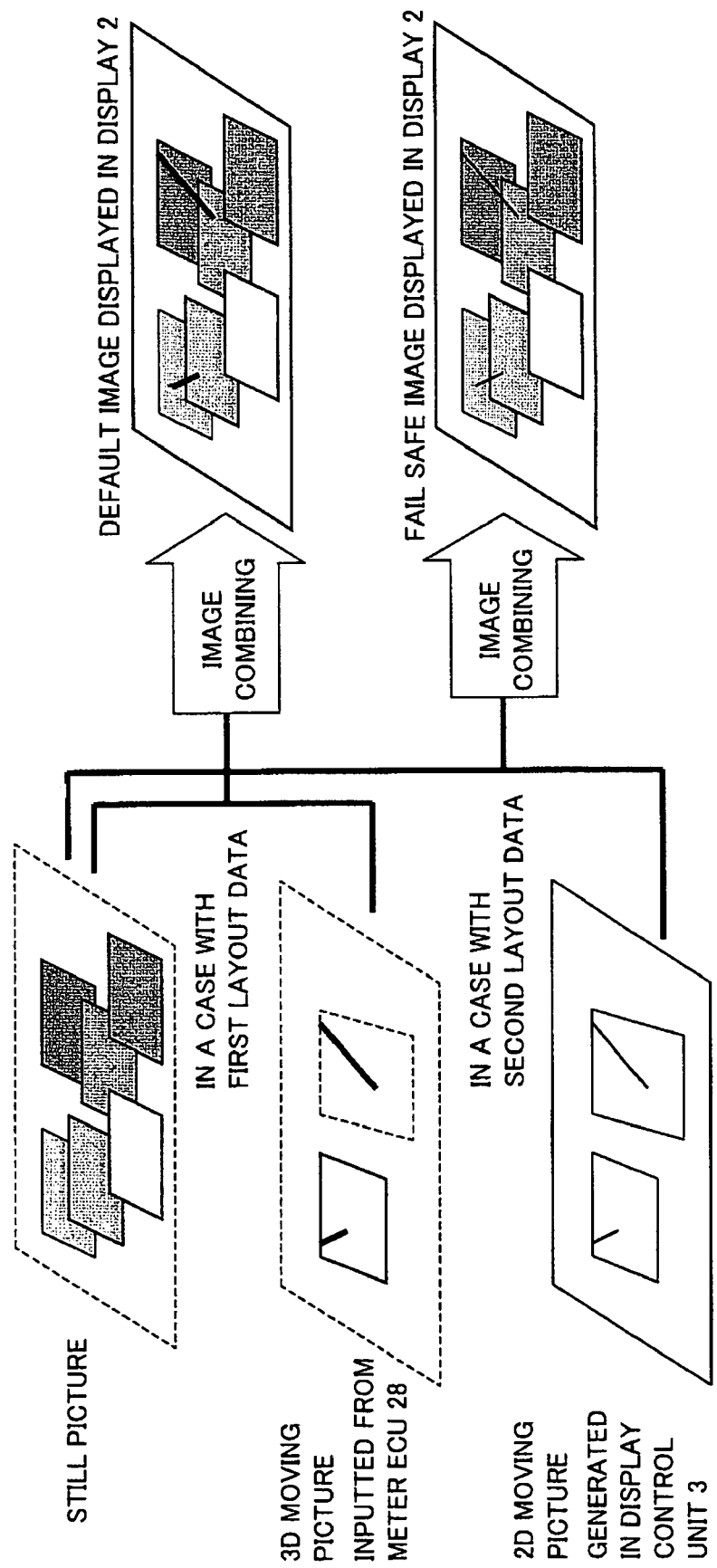
FIG. 4 is a block diagram showing an operation of the on-vehicle display system according to a preferred embodiment of the present invention at normal times.

Moreover, as shown in FIG. 4, the fail safe image preferably is displayed at the same display position in the same size as the default image. That is, from the driver's side, an area of the 3D moving picture is automatically changed and the 2D moving picture is displayed therein, instead (when there is a problem in the state of the meter ECU 28 or the like). For this reason, even if the default image is changed to the fail safe image, the driver hardly feels anything strange. This makes it possible to more enhance the safety of driving.

Furthermore, the alternative data constantly generated by the display control unit 3 is the 2D moving picture data and the fail safe image is a 2D image. Therefore, even when there is a problem, it is possible to guarantee the safety of driving without the fear of imposing a burden on the display control unit 3. Moreover, the default image is a 3D image and thus a high-quality display can be performed at normal times.

Figure 7:
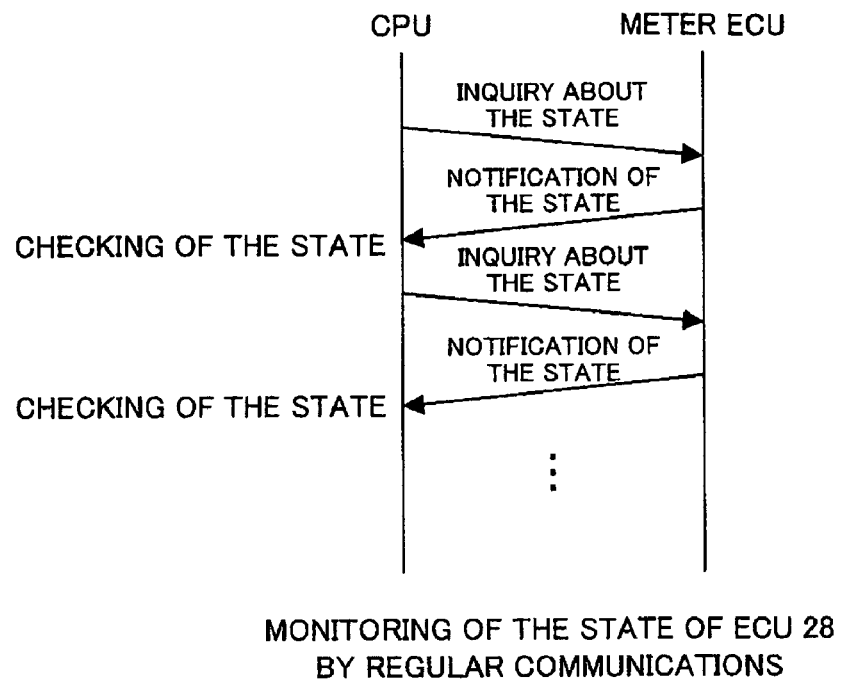
FIG. 7 is a schematic view showing a method of judging a state of a meter ECU.
Figure 8:
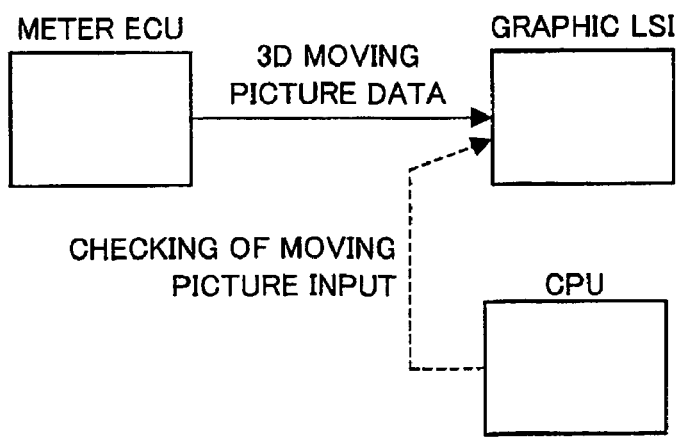
FIG. 8 is a schematic view showing a method of judging an input status of 3D moving picture data.
Figure 9:
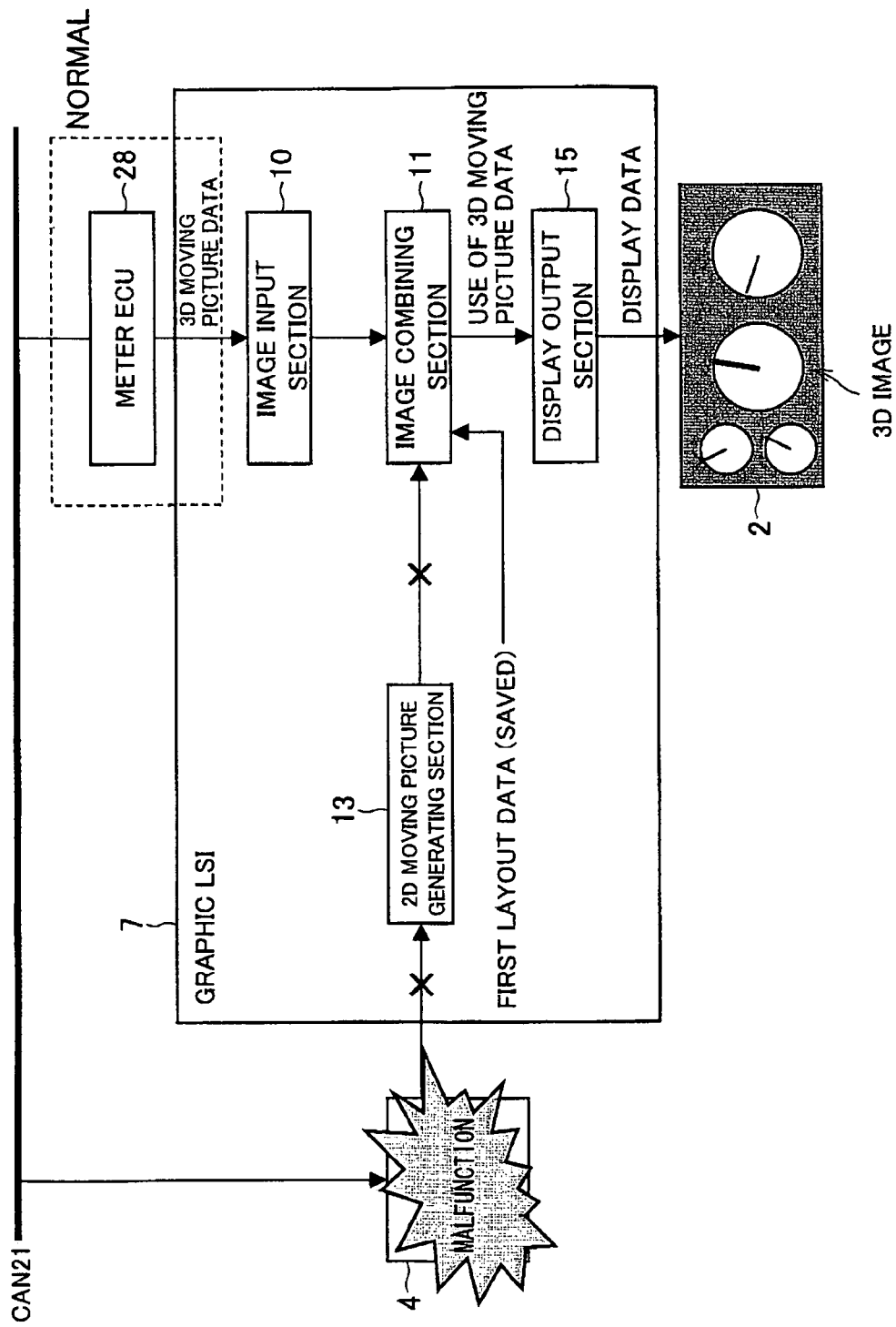
FIG. 9 is a block diagram showing an operation of the on-vehicle display system according to a preferred embodiment of the present invention when a CPU malfunctions.
Figure 10:
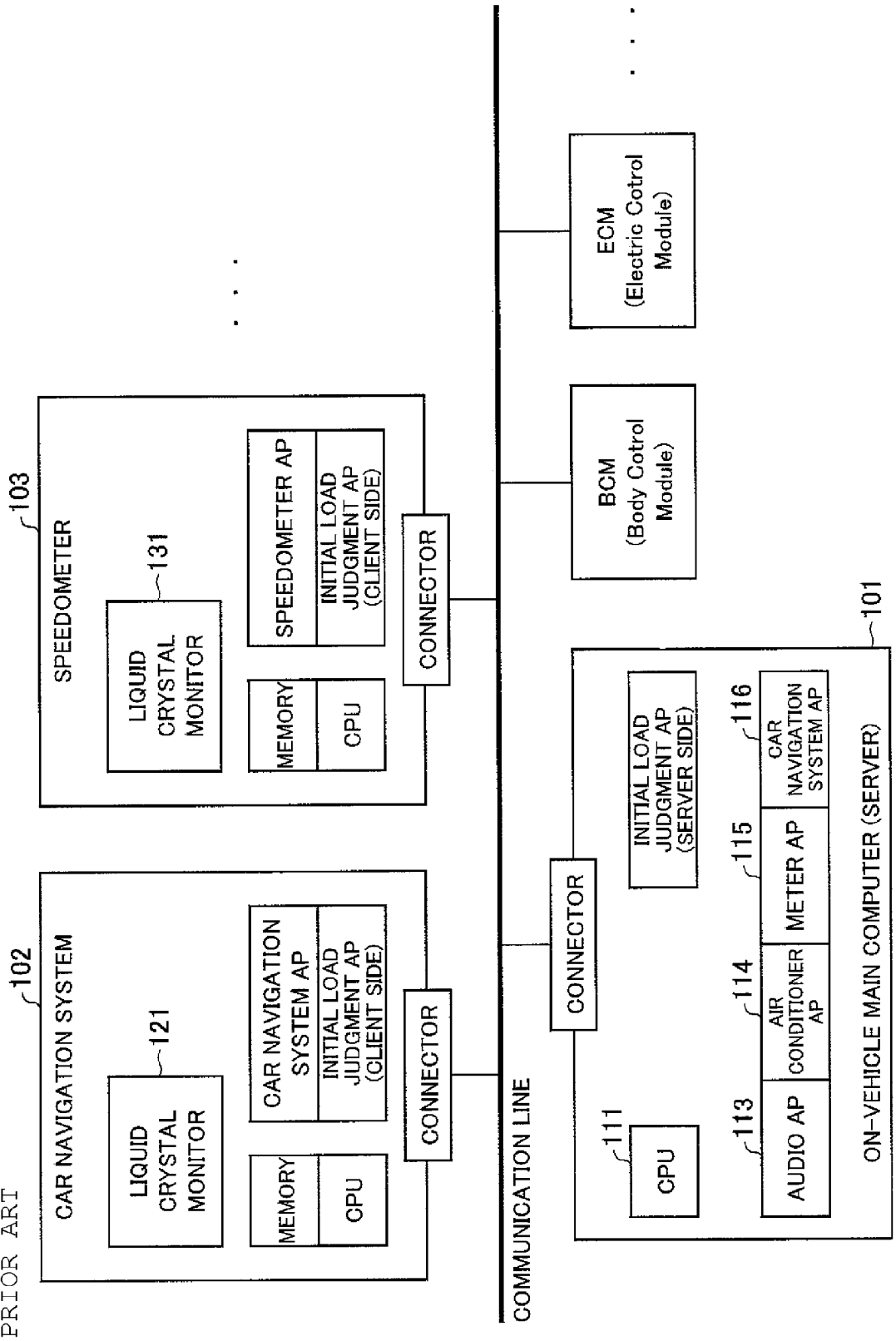
FIG. 10 is a block diagram showing a configuration of a conventional on-vehicle display.

Furthermore, as one specific example of judgment of the status of the meter ECU 28, FIG. 7 shows a method such that the CPU (fail safe control section) regularly exchanges messages with the meter ECU via the CAN and when receiving no response message or an error response message, the CPU judges, "There is a problem in the state of the meter ECU". Moreover, as one specific example of monitoring of the input status of the 3D moving picture data, FIG. 8 shows a method such that the CPU (fail safe control section) directly checks the input status of the moving picture inputted from the meter ECU to the to the graphic LSI (image input section). That is, the CPU checks whether or not the 3D moving picture data is inputted and when no 3D moving picture data is inputted, the CPU judges, "There is a problem".

Furthermore, when the problem with the meter ECU 28 or the input status of the 3D moving picture data is solved, the on-vehicle display system 1 resumes the normal operation as shown in FIG. 2. That is, the display layout control section 33 outputs the first layout data to the graphic LSI (image combining section 11).

It is preferable that the on-vehicle display system 1 save the first layout data issued from the CPU 4 in the graphic LSI 7. According to this, even when there is a problem in the CPU 4, it is possible to continue displaying the (3D) image of the meters and gauges on the basis of the first display layout data by using the still picture data of the storage section 5 and the meter pointer 3D moving picture data generated by the meter ECU 28. This makes it possible to further enhance the safety of driving.

Furthermore, the in-vehicle (on-vehicle) LAN used in the present preferred embodiment is not limited to the CAN, but a LAN of any kind or standard, such as LIN (Local Interconnect Network), MOST (Media Oriented Systems Trans-Port), or FlexRay (registered trademark) is adoptable provided that the LAN can realize the foregoing functions.

Moreover, the technical idea in the on-vehicle display system according to preferred embodiments of the present invention is widely applicable to a general moving object, such as an aircraft, a vessel, or the like.

The present invention is not limited to the description of the preferred embodiments above, but a preferred embodiment based on a proper combination of the configurations and technical features disclosed in the preferred embodiments above is also encompassed in the present invention.

An on-vehicle display system according to a preferred embodiment of the present invention is widely applicable as an information display system in a vehicle, such as an automobile, an electric train, or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An on-vehicle display control unit comprising:
   a processor to which vehicle data of various kinds are inputted; and
   a display data generating section arranged to generate display data to be outputted to a display; wherein
   the display data generating section is arranged to generate predetermined display data from image data generated outside the display control unit, and the display data generating section is arranged to receive a fail safe control from the processor in case of a problem with what generates the image data or with input of the image data, so as to generate fail safe display data corresponding to the predetermined display data.

2. The display control unit as set forth in claim 1, wherein the display data generating section, even at normal times when the problem does not occur, generates alternative data corresponding to the image data in accordance with instructions from the processor.

3. The display control unit as set forth in claim 2, wherein the display data generating section receives the fail safe control to generate the fail safe display data from the alternative data.

4. The display control unit as set forth in claim 1, wherein the processor monitors at least one of (i) what generates the image data, and (ii) the input of the image data, and the processor carries out the fail safe control in response to occurrence of the problem.

5. The display control unit as set forth in claim 1, wherein the predetermined display data is data used to display a default image of meters and gauges.

6. The display control unit as set forth in claim 5, wherein the fail safe display data is data used to display a fail safe image corresponding to the default image at the same display position in the same display size as the default image.

7. The display control unit as set forth in claim 5, wherein the fail safe display data is data used to display the fail safe image corresponding to the default image in a simpler style than the default image.

8. The display control unit as set forth in claim 2, wherein the image data and the alternative data are both moving picture data, the alternative data being smaller in size than the image data.

9. The display control unit as set forth in claim 2, wherein:
the fail safe control causes the processor to output second display layout data instead of first display layout data that is outputted by the processor when the problem does not occur;
the display data generating section is arranged to generate, based on the first display layout data, the predetermined display data from still picture data stored and the image data, so that the predetermined display data is generated as data for displaying the default image of the meters and gauges, but when receiving the fail safe control, the display data generating section generates, based on the second display layout data, the fail safe display data from the still picture data stored and the alternative data, so that the fail safe display data is generated as data to display the fail safe image of the meters and gauges.

10. The display control unit as set forth in claim 1, wherein the processor is connected to an in-vehicle network, from which the vehicle data is supplied.

11. The display control unit as set forth in claim 10, wherein the image data generated by an image data generating unit connected to the in-vehicle network is supplied to the display data generating section.

12. The display control unit as set forth in claim 11, wherein the processor is arranged to monitor a state of the image data generating unit via the in-vehicle network.

13. The display control unit as set forth in claim 11, wherein the processor is arranged to monitor an input status of the image data inputted from the image data generating unit to the display data generating section.

14. The display control unit as set forth in claim 9, wherein the display data generating section is arranged to save the first display layout data outputted from the processor, and the display data generating section is arranged to generate, based on the first layout data, the data used to display the image of the meters and gauges even when there is a problem in the processor.

15. The display control unit as set forth in claim 10, wherein the in-vehicle network is any one of Controller Area Network, a Local Interconnect Network, a Media Oriented Systems Trans-Port, and a FlexRay (registered trademark).

16. The display control unit as set forth in claim 1, wherein:
the processor includes a CPU; and
the display data generating section includes a graphic LSI.

17. An on-vehicle display system comprising:
a display control unit as set forth in claim 1; and
a display.

18. An on-vehicle display controller comprising:
a processor to which vehicle data is inputted; and
a display data generating section arranged to generate data to display an image in a display; wherein
at normal times, the display data generating section is arranged to generate data to display a default image from image data supplied from an outside thereof; and
the display data generating section includes an auxiliary data generating section arranged to generate auxiliary data corresponding to the image data in response to instructions from the processor, and the display data generating section is arranged to generate, in case of a problem with generation of the image data or input of the image data, from the auxiliary data, data to display a fail safe image alternative to the default image.

19. The display controller as set forth in claim 18, wherein the auxiliary data generating section is arranged to generate the auxiliary data also at normal times.

20. The display controller as set forth in claim 18, wherein the processor is arranged to monitor at least one of the generation of the image data and the input of the image data, and if a problem occurs in what is monitored, the processor instructs the display data generating section to use the auxiliary data instead of the image data.

21. An on-vehicle display comprising:
a display; and
a display controller arranged to control the display; wherein
at normal times, the on-vehicle display is arranged to display a default image from image data supplied from an outside of the display controller;
the display controller including an auxiliary data generating section arranged to generate auxiliary data corresponding to the image data, the display controller is arranged to display, in case of a problem with generation of the image data or in input of the image data, a fail safe image alternative to the default image from the auxiliary data.

22. The on-vehicle display as set forth in claim 21, wherein the auxiliary data generating section is arranged to generate the auxiliary data also at normal times.

* * * * *

UNITED STATES PATENT AND TRADEMARK OFFICE
CERTIFICATE OF CORRECTION

PATENT NO. : 8,094,003 B2
APPLICATION NO. : 12/513706
DATED : January 10, 2012
INVENTOR(S) : Masui et al.

Page 1 of 1

It is certified that error appears in the above-identified patent and that said Letters Patent is hereby corrected as shown below:

Please add the following to the Title page of the patent:

Item (30)   Foreign Application Priority Data

November 22, 2006   (JP) ................................ 2006-316242

Signed and Sealed this
Twenty-ninth Day of May, 2012

David J. Kappos
*Director of the United States Patent and Trademark Office*